United States Patent [19]
Ralph

[11] Patent Number: 6,123,292
[45] Date of Patent: Sep. 26, 2000

[54] MAIN LANDING GEAR HAVING INDEPENDENT STEERING OF EACH AXLE ON MULTIPLE AXLE TRUCKS

[75] Inventor: Harry C. Ralph, Kirkland, Wash.

[73] Assignee: The Boeing Company, Seattle, Wash.

[21] Appl. No.: 09/140,486

[22] Filed: Aug. 26, 1998

Related U.S. Application Data

[63] Continuation-in-part of application No. 08/717,617, Sep. 20, 1996, abandoned, which is a continuation-in-part of application No. 08/214,483, Mar. 17, 1994, abandoned.

[51] Int. Cl.[7] .................................................. B64C 25/02
[52] U.S. Cl. ........................................ 244/50; 244/103 R
[58] Field of Search ........................... 244/100 R, 103 R, 244/103 W, 50, 102 R; 180/140–143, 152; 280/24.1, 97, 81.5, 24

[56] References Cited

U.S. PATENT DOCUMENTS

| | | | |
|---|---|---|---|
| 2,567,074 | 9/1951 | Kupiec | 244/50 |
| 2,630,285 | 3/1953 | Geisse | 244/103 W |
| 2,652,215 | 9/1953 | Brukner | 244/50 |
| 3,099,460 | 7/1963 | Sheehan | 180/24.1 |
| 3,134,458 | 5/1964 | Westcott, Jr. | 244/111 |
| 3,643,898 | 2/1972 | Whitener et al. | 244/50 |
| 5,417,299 | 5/1995 | Pillar et al. | 180/24.1 |
| 5,513,821 | 5/1996 | Ralph | 244/103 W |
| 5,613,651 | 3/1997 | Meneghetti | 244/50 |

FOREIGN PATENT DOCUMENTS

| | | | |
|---|---|---|---|
| 492688 | 7/1992 | European Pat. Off. | 244/103 R |

*Primary Examiner*—Galen L. Barefoot
*Attorney, Agent, or Firm*—Conrad O. Gardner

[57] ABSTRACT

A main landing gear system which employs Ackermann type steering utilizing kingpins and tierods wherein a plurality of paired wheels are employed and wherein each truck axle is adapted for independent steering. Electronic control means along with hydraulic directional valve means are utilized.

6 Claims, 13 Drawing Sheets

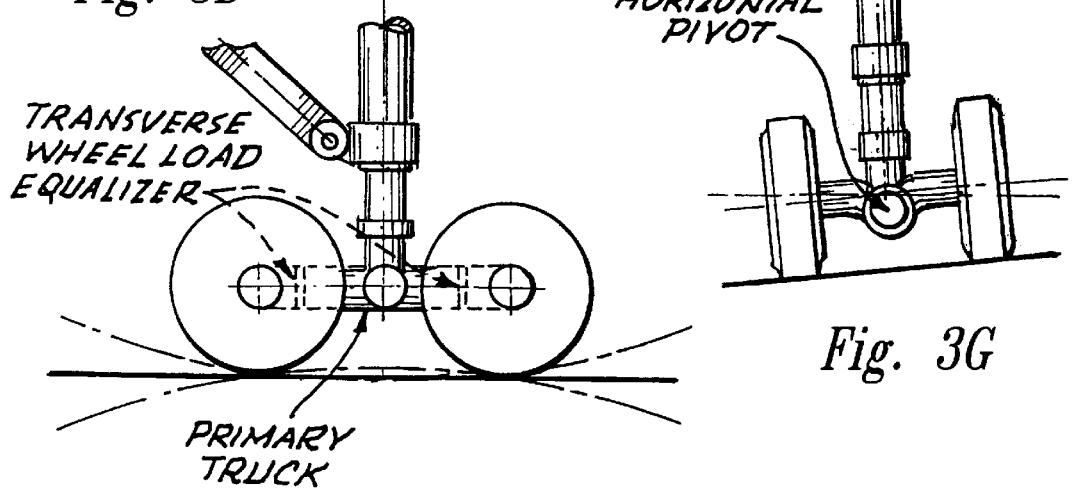
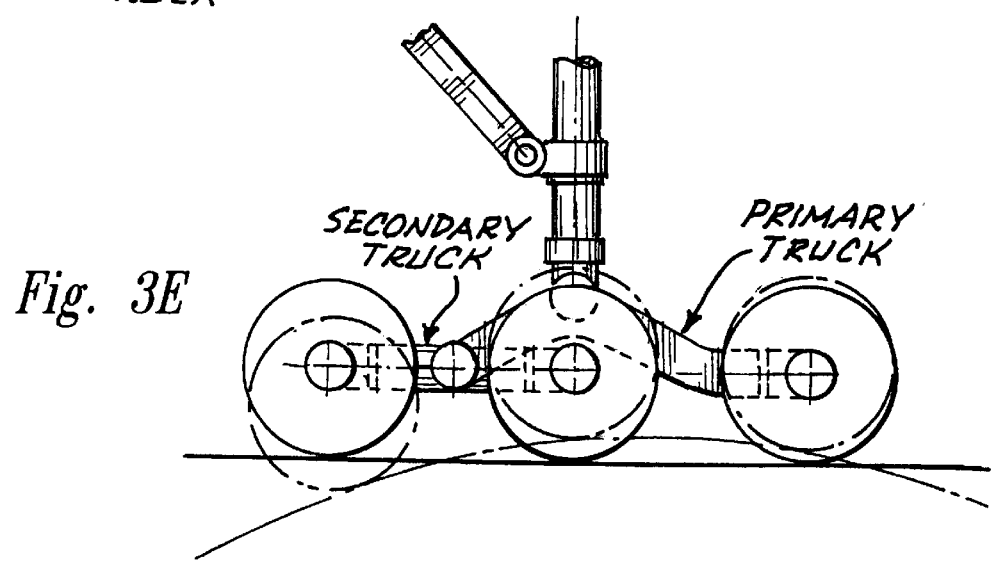
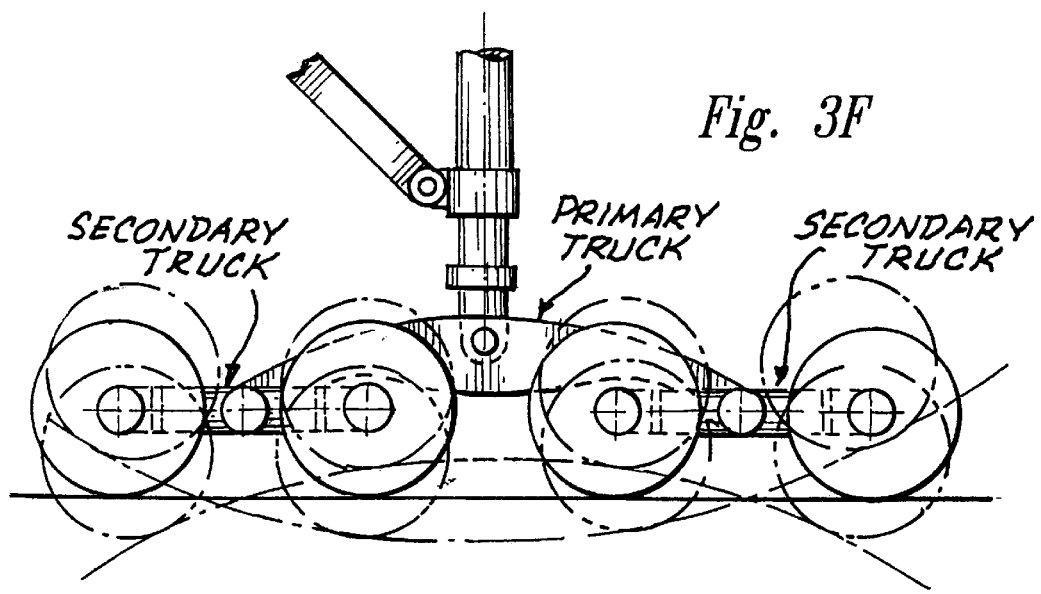

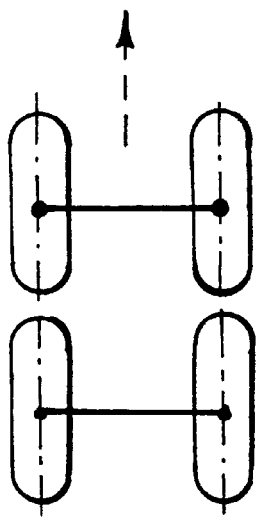 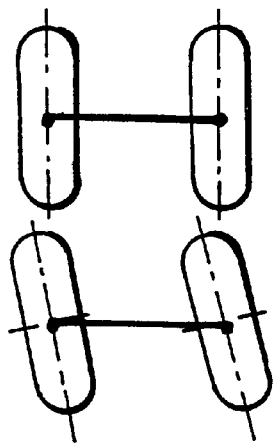 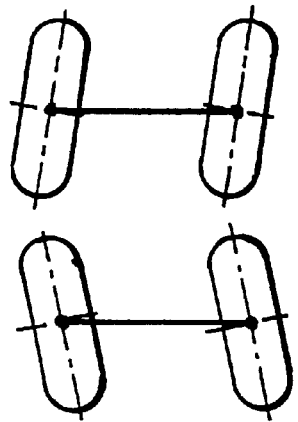
Fig. 4A    Fig. 4B    Fig. 4C
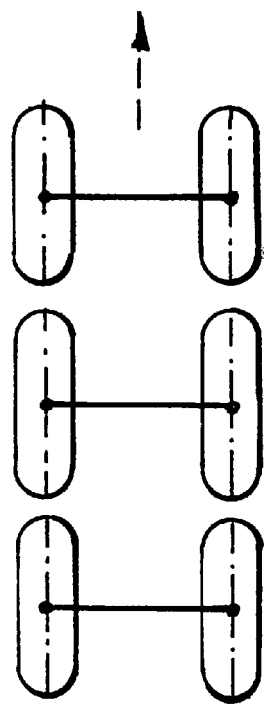 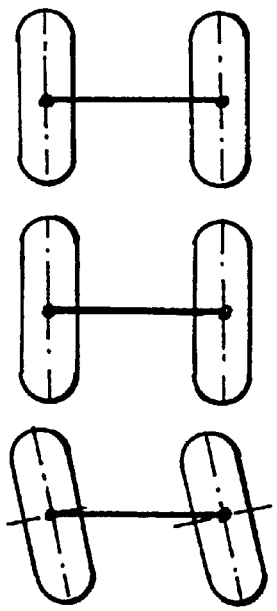 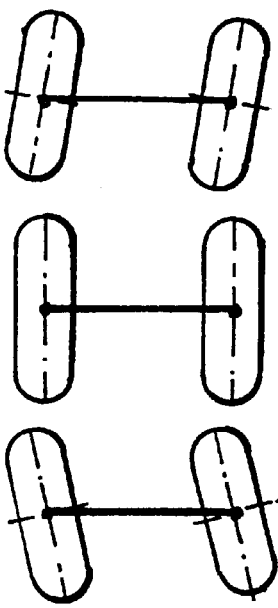
Fig. 5A    Fig. 5B    Fig. 5C

MAIN LANDING GEAR HAVING INDEPENDENT STEERING OF EACH AXLE ON MULTIPLE AXLE TRUCKS

CROSS-REFERENCES TO RELATED APPLICATIONS

This application is a continuation-in-part application of application Ser. No. 08/717,617, filed Sep. 20, 1996, now abandoned, which is a continuation-in-part of application Ser. No. 08/214,483, filed Mar. 17, 1994, now abandoned.

BACKGROUND OF THE INVENTION

1. Field of the Invention

The present invention relates to aircraft steerable main landing gear and more particularly to main landing gear for larger aircraft where wheels per landing gear and/or gears per aircraft increase.

2. Description of the Prior Art

In the patent literature, U.S. Pat. No. 2,567,074 to Kupiec; U.S. Pat. No. 2,682,311 to Bishop; and U.S. Pat. No. 3,516,625 to Hauser, et al. are illustrative of steering which is accomplished by pivoting the entire truck about a vertical axis as a single unit. Control of relative rotation between trucks is accomplished by a variety of means in these systems.

U.S. Pat. No. 2,630,285 to Geisse shows a means of coupling pairs of wheels on a common axis using kingpins and tierods. Systems are shown for both single and multiple axle landing gear trucks. In contrast to the present system, castered wheels are shown for self alignment. There is no mechanism for steering the wheels.

Great Britain Patent No. 904,783 is exemplary of load equalization techniques wherein there is shown wheel truck where wheel pairs articulate about a longitudinal axis so as to equalize wheel loads when an aircraft encounters transverse terrain contours.

U.S. Pat. No. 4,917,334 to Ralph et al. shows a multi-wheeled trailing type landing gear. In this configuration, the forward axle (2 wheels) is mounted directly to the shock strut. The aft two axles, 2 wheels each, are mounted on a truck which is cantilevered from the aft side of the strut on a pivoting radius arm. Shock absorbers are used to react the vertical loads. This is in contrast to the present load equalization where a primary truck is pivoted on the shock strut, and secondary trucks are pivoted on the ends of the primary strut.

As aircraft get progressively larger, wheels per landing gear (and/or gears per aircraft) increase the amount in order to offset the problems in flotation and tire loading limitations.

However, as the number of wheels and gears increase, so does the reluctance of the main landing gear to allow the aircraft to turn during steering.

The main landing gears increasing adhesion to the ground (tracking) causes a reducing adhesion to the ground at the nose gear. When the ground adhesion at the nose gear approaches zero, the directional control of the aircraft during taxi is greatly decreased.

During tractor towing operations, the nose gear steering angle is governed by the tractor but heavy torsional loads can be induced into the main landing gears resulting in heavy designs.

The above problems have resulted in the incorporation of the "body gear steering system". However, without the advantage of load equalization the turning moments due a one tire flat situation, are reacted by the steering actuators. This results in exceptionally large and heavy actuators.

SUMMARY OF THE INVENTION

A main landing gear steering system which uses the "Ackermann Steering System" (Automotive type with kingpins and tierods). Each truck axle is a candidate for independent steering, depending on the amount of control desired. When combined with electronic control of hydraulic directional valves, the axles can be turned in opposite directions to give minimum turning radius, or all turned the same direction to compensate for a side drift landing, or any combination in between.

BRIEF DESCRIPTION OF THE DRAWING(S)

FIGS. 3D, 3E, 3F and 3G are illustrative of the solutions to the problems shown in FIGS. 3A, 3B and 3C;

Figure 1:
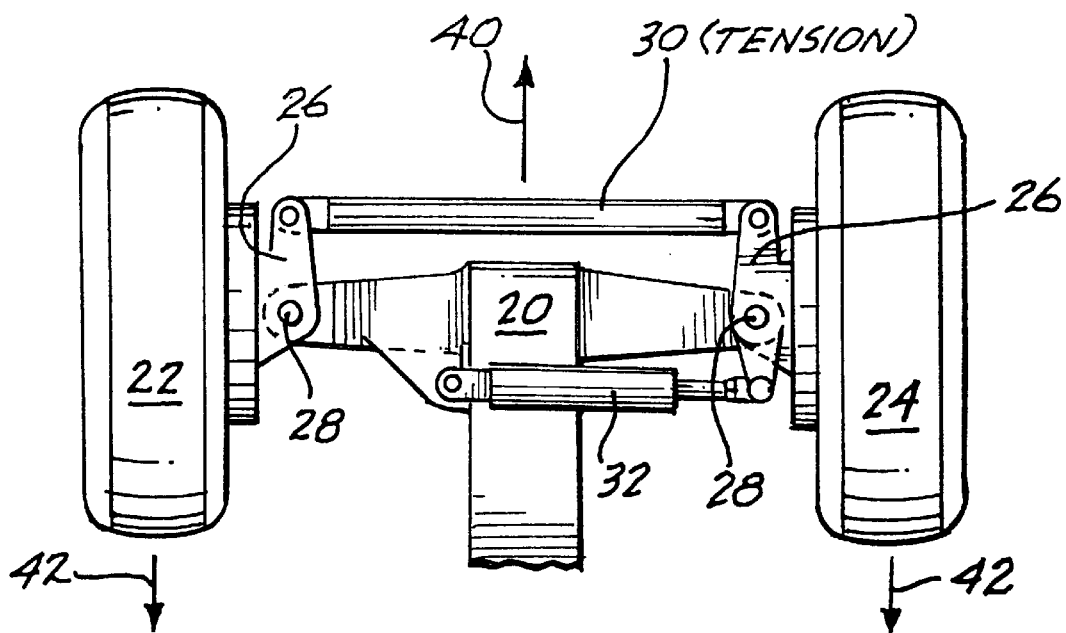
FIG. 1 is a plain view illustrative of Ackermann system components for paired wheels on a truck axle.
Figure 6:
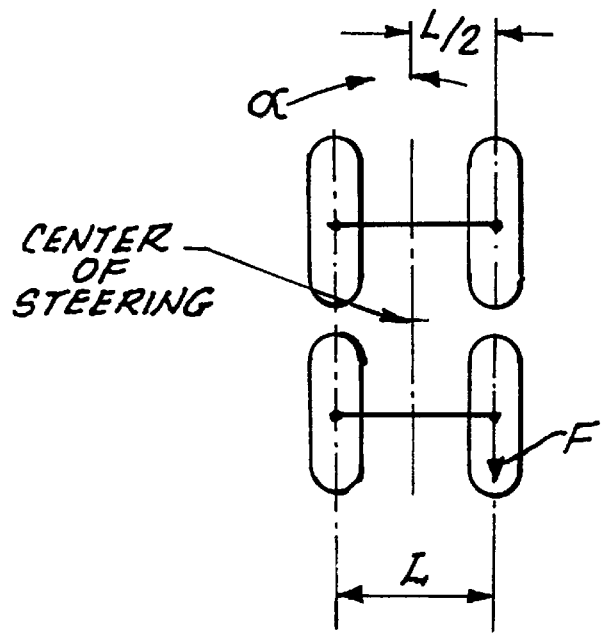
Figure 7:
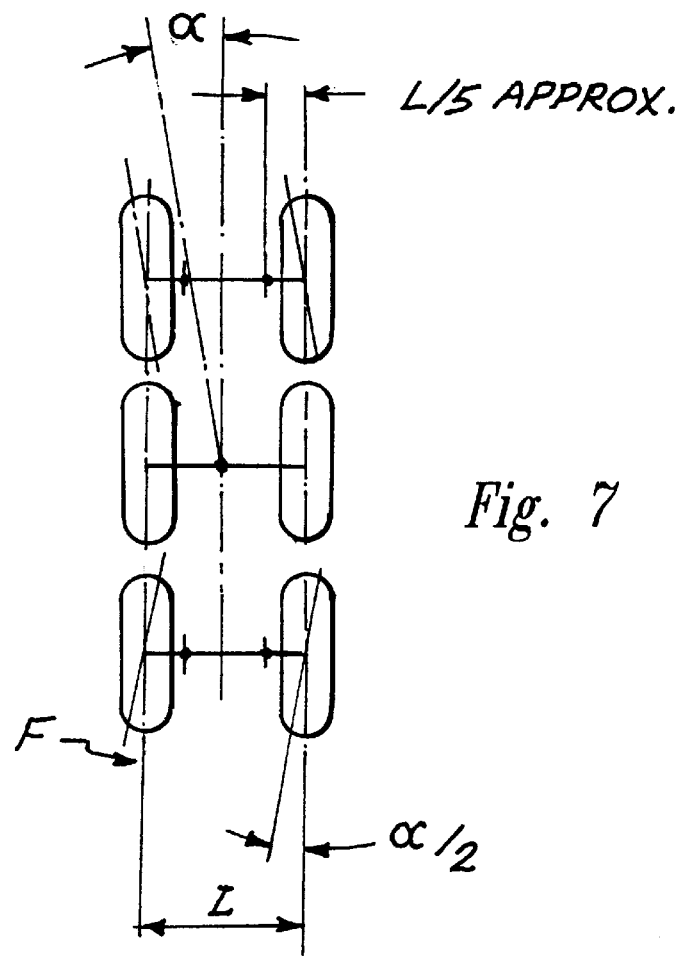
Figure 8D:
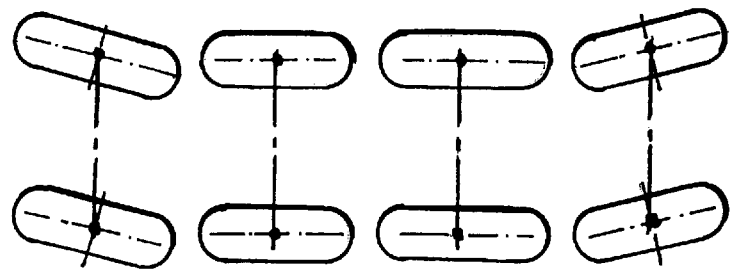
Figure 8C:
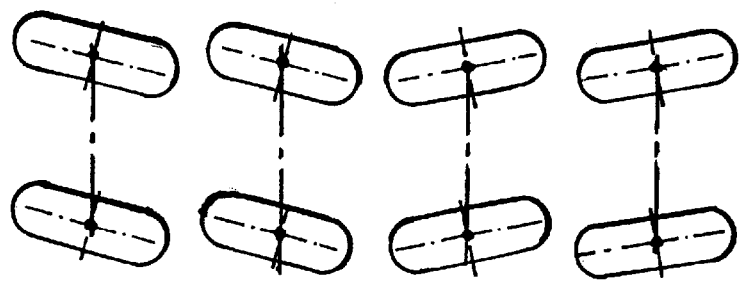
Figure 8B:
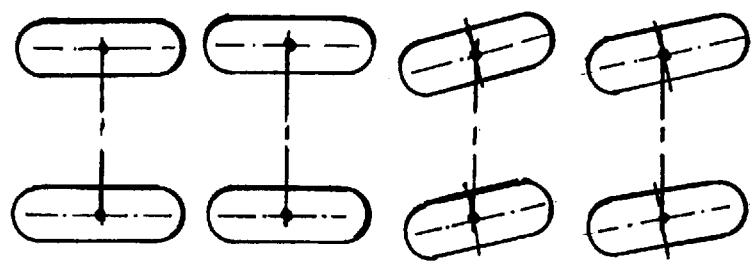
Figure 8A:
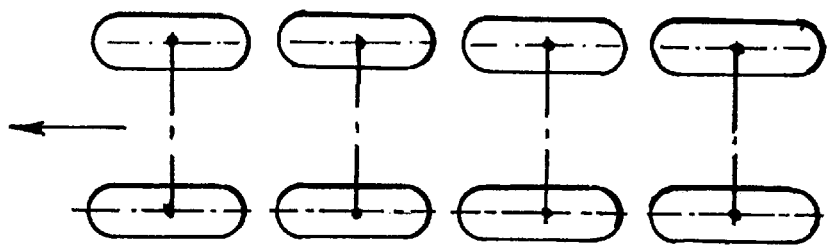
Figure 9:
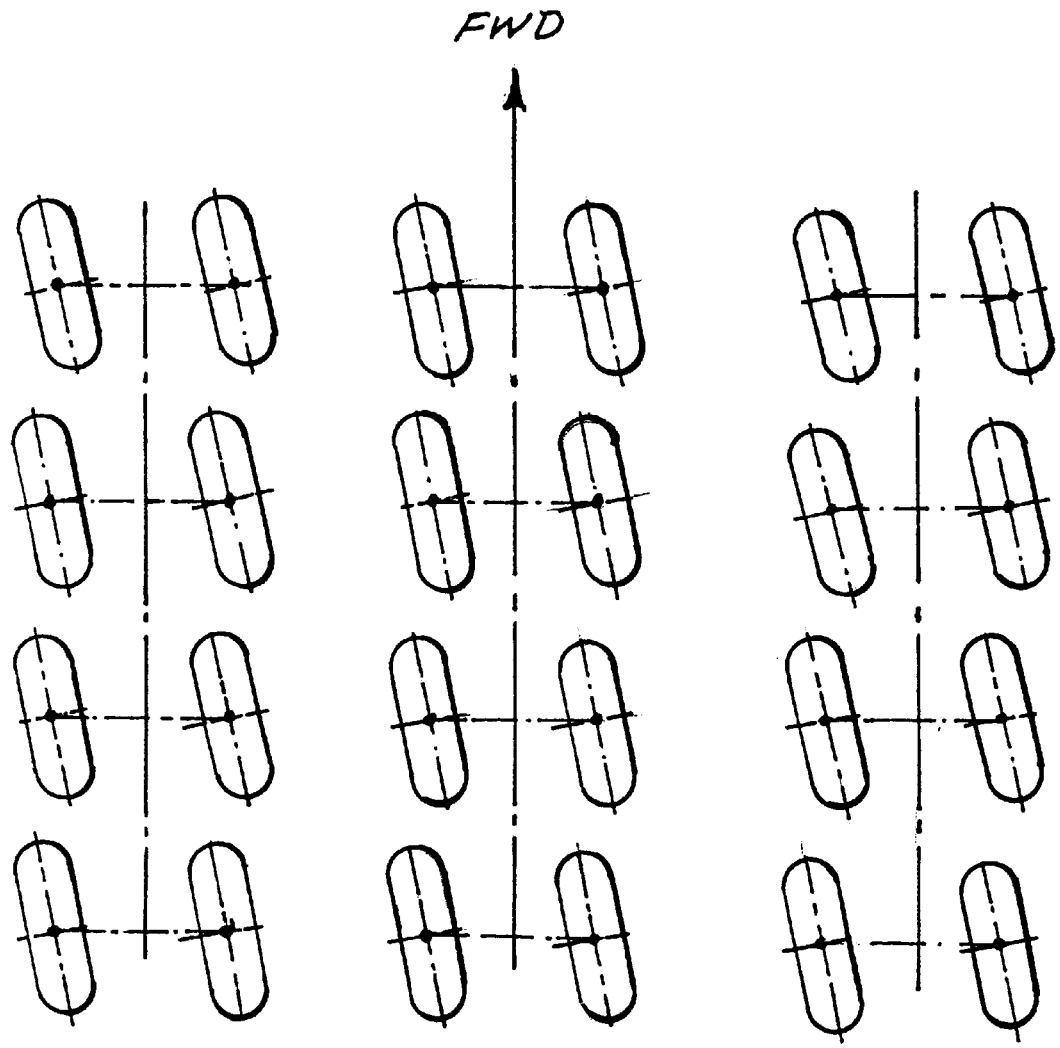
Figure 10:
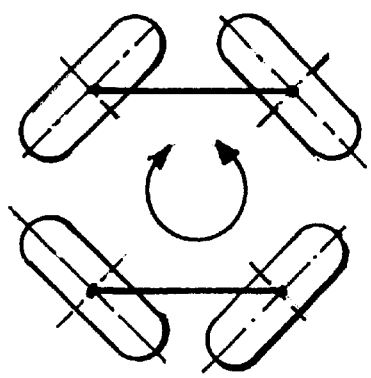
Figure 11:
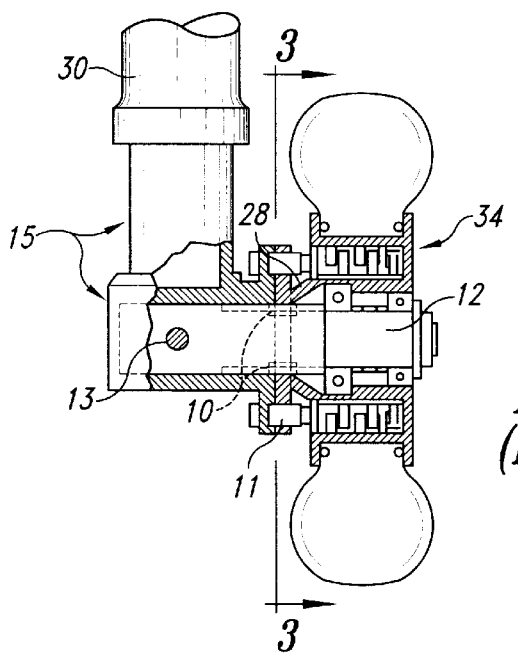
Figure 12:
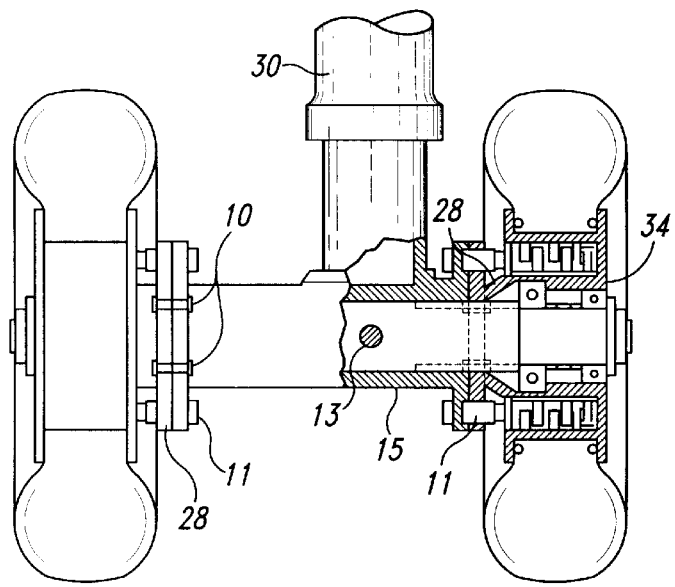
Figure 13:
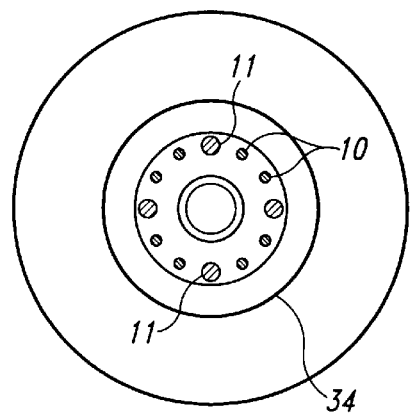
Figure 15:
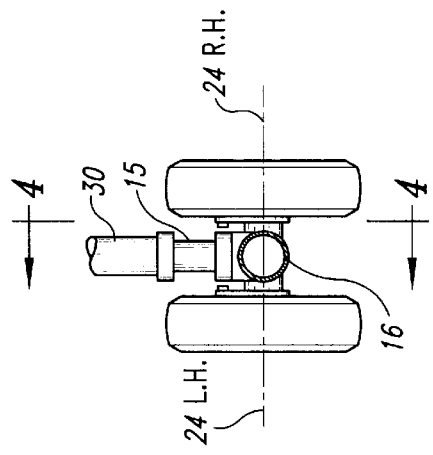
Figure 14:
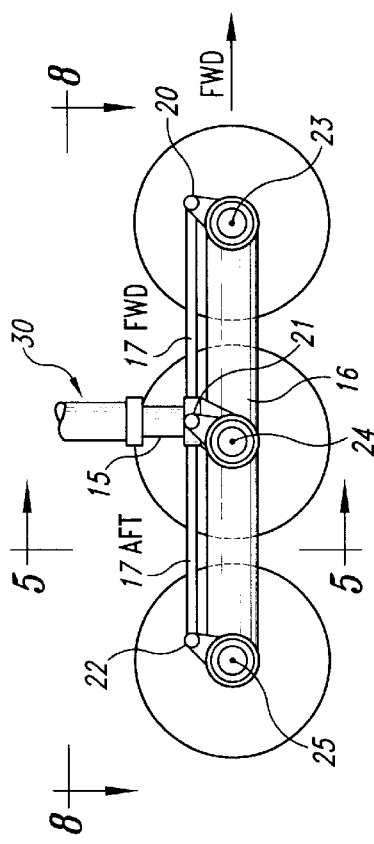
Figure 16:
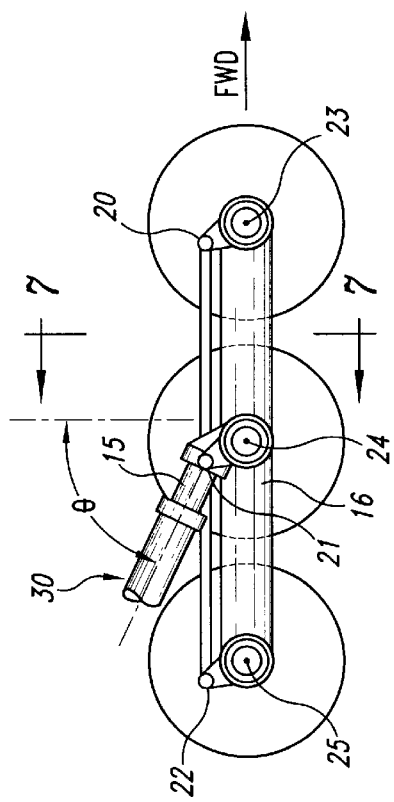

FIGS. 4A, 4B and 4C utilize the arrangement of FIG. 1 utilized for steering a 4-wheeled truck;

FIGS. 5A, 5B and 5C incorporate the steering arrangement of FIG. 1, however applied to a 6 wheeled truck;

FIG. 6 is illustrative of a Boeing 747 type aircraft body gear;

FIG. 7 is illustrative of the present single wheel steering main landing gear system;

FIGS. 8A, 8B, 8C and 8D show steering arrangements for steering an 8-wheeled truck utilizing the present single wheel steering main landing gear systems concept;

FIG. 9 is illustrative of how the present single wheeled system can be utilized in a 8-wheeled truck to offset the effect of a side drift landing;

FIG. 10 while representative of an improbable but if practical configuration relating to the near elimination of pivoting loads;

FIGS. 11, 12 and 13 are illustrative of current methods of attachment, and transfer of brake torque, for single and twin wheeled landing gears;

FIG. 14 shoes a brake compensating link 17 arrangement for a current 6-wheeled truck in the "gear down" attitude;

FIG. 15 is a section through the middle axle 24, (as shown in FIG. 14) and shows a fixed (or pinned) hollow axle 12;

FIG. 16 shows a brake compensating link (17 fore and aft) arrangement for a current 6-wheeled truck in the "gear retracted" attitude, illustrating the relative rotating angle "θ".

Figure 17:
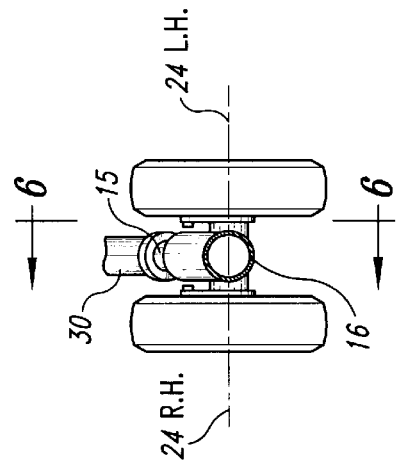
Figure 18:
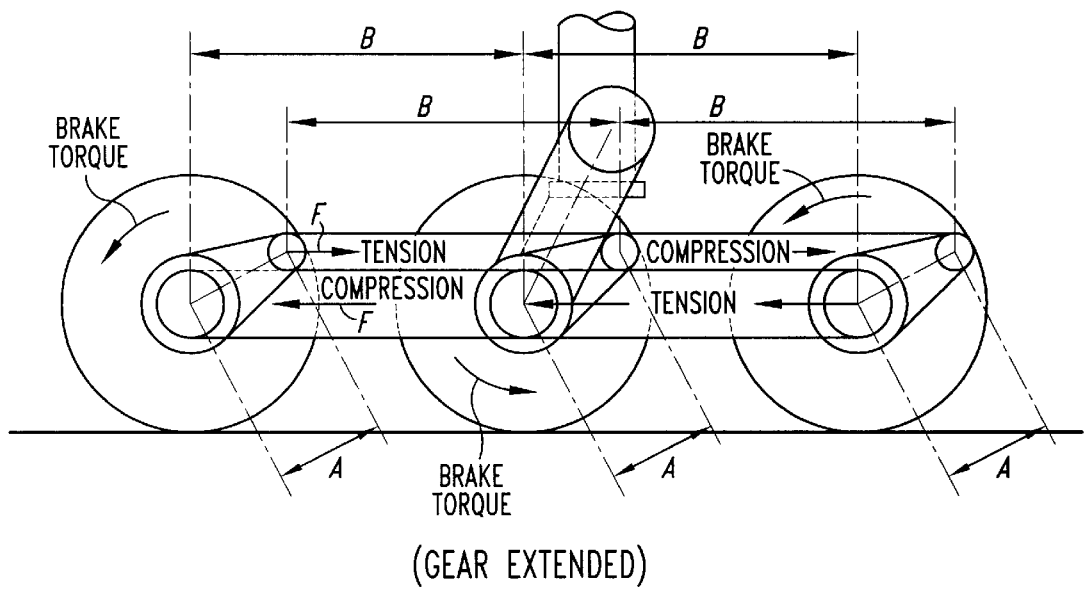

FIG. 17 is a section through the fore and aft axles (23 and 25 respectively as shown in FIG. 16) and shows a typical position of the gear post 32 when retracted. An excessive value of the angle "θ" necessitates the use of two single compensating links due to structural installation difficulties, and the present invention hereinafter described ensures the correct link geometry during steering in both cases;

FIG. 18 is illustrative of the 6-wheeled truck of FIG. 4 shown in gear extended position.

Figure 19:
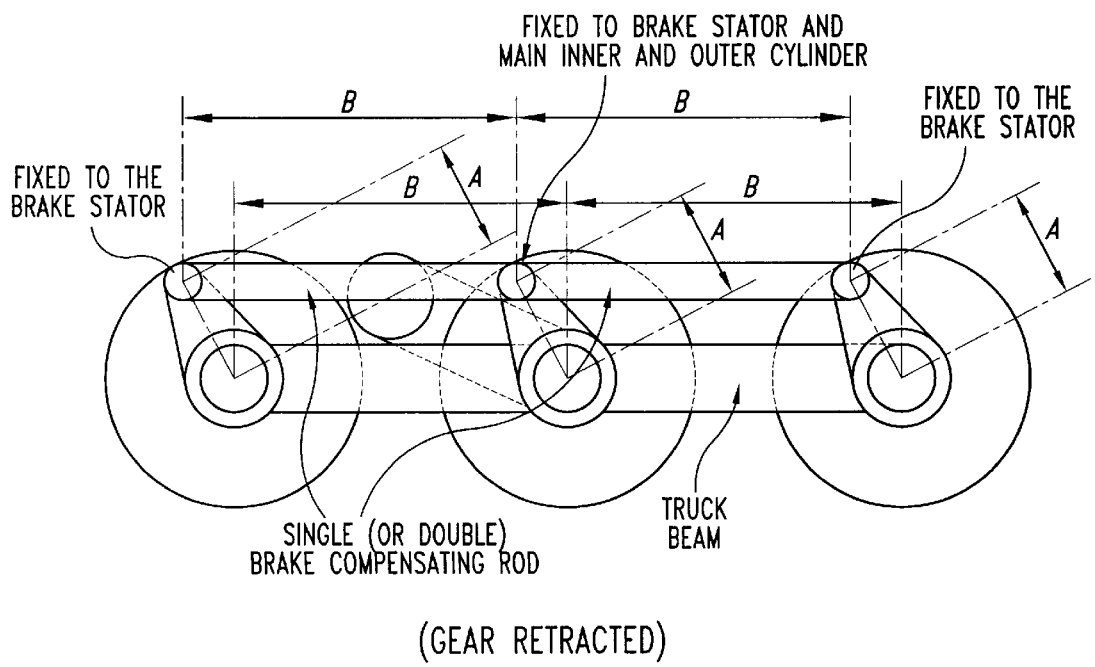

FIG. 19 is illustrative of the 6-wheeled truck of FIG. 4 shown in gear retracted position.

Figure 20:
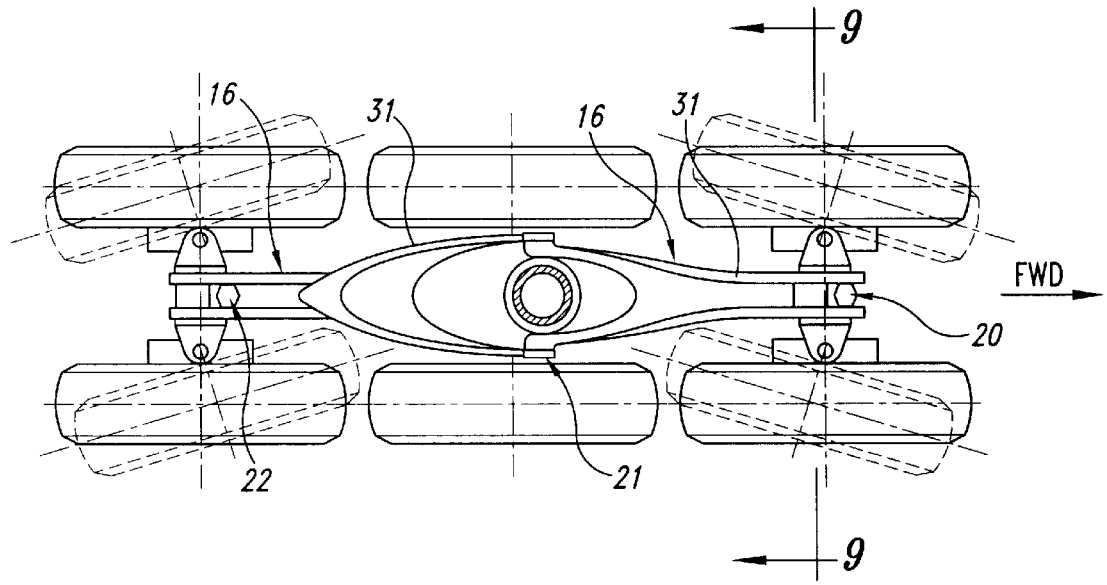
Figure 21:
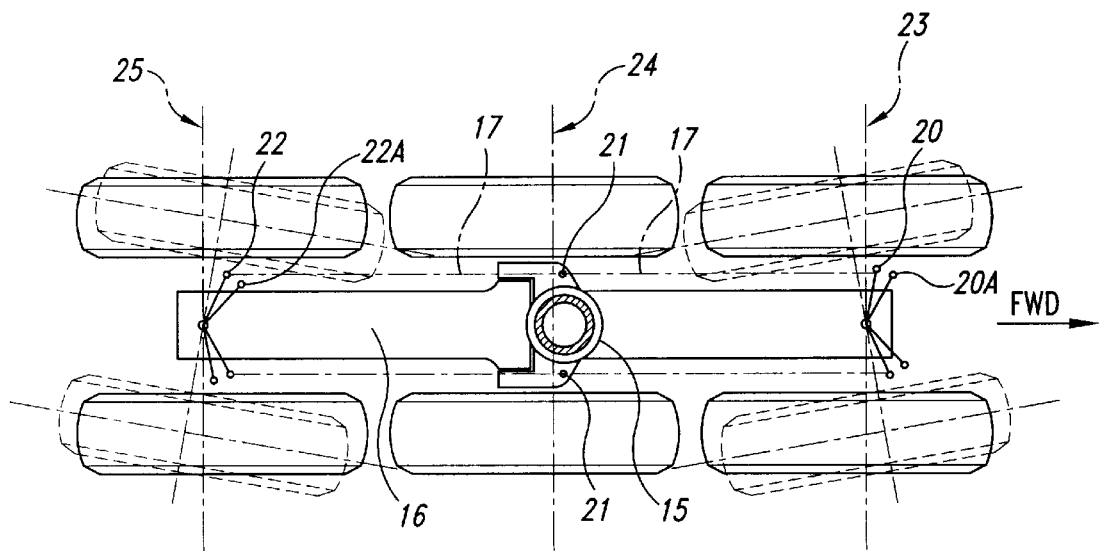

FIG. 20 illustrates how a conventional brake compensating link can seriously limit the movement the steering of a main landing gar wheel, and in addition, large steering angles are limited to say ±15° because of the ball-jointed end constraints;

FIG. 21 is illustrative of the advantages of the present single compensating link in accordance with the present invention hereinafter described (with regard to wheel clearance while steering) when a kingpin or single wheel steering system is used.

Figure 22:
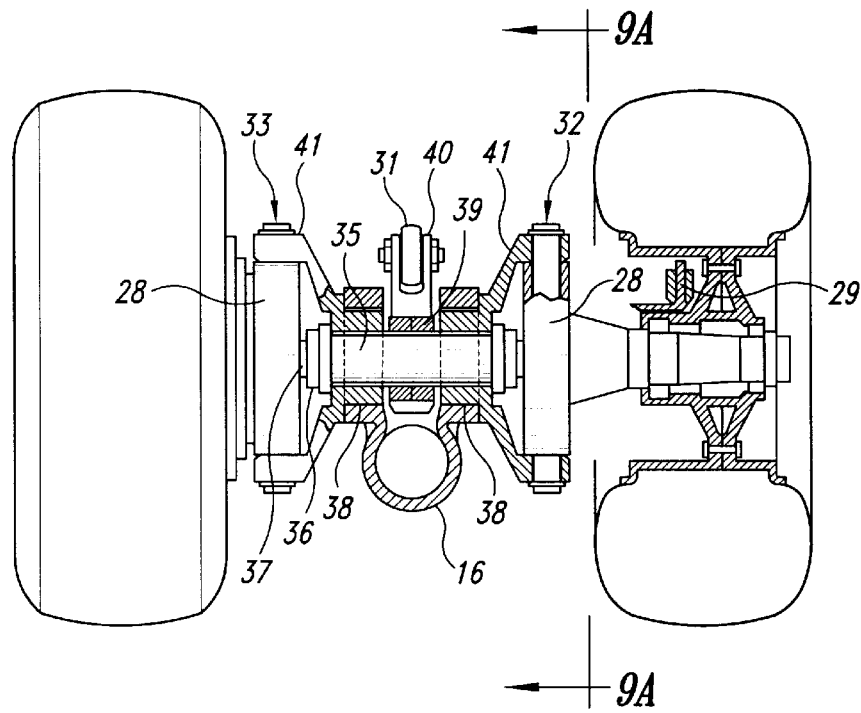
Figure 23:
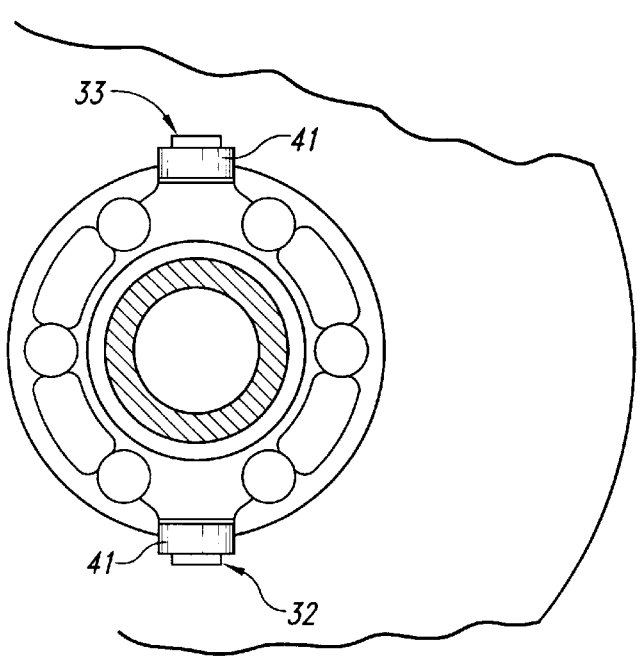
Figure 24:
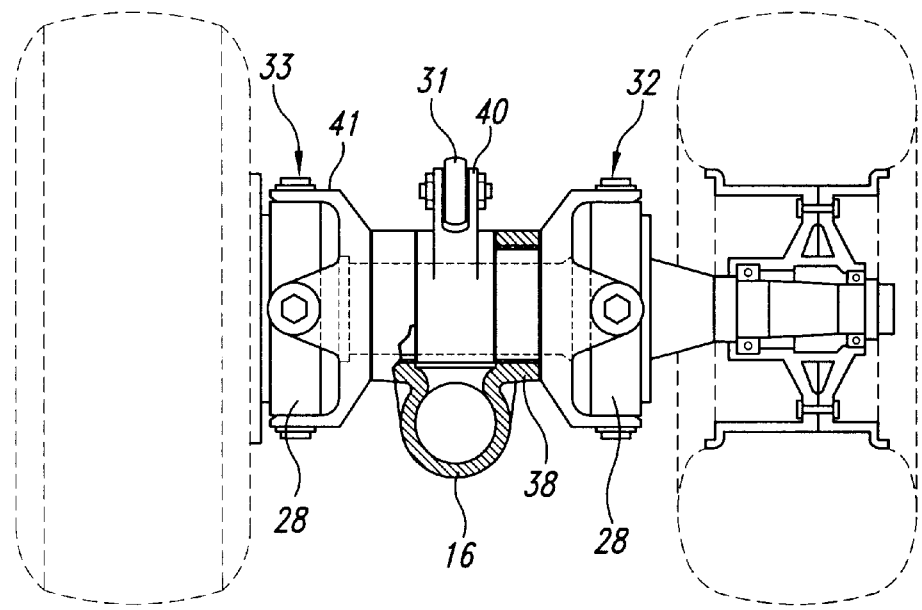
Figure 25:
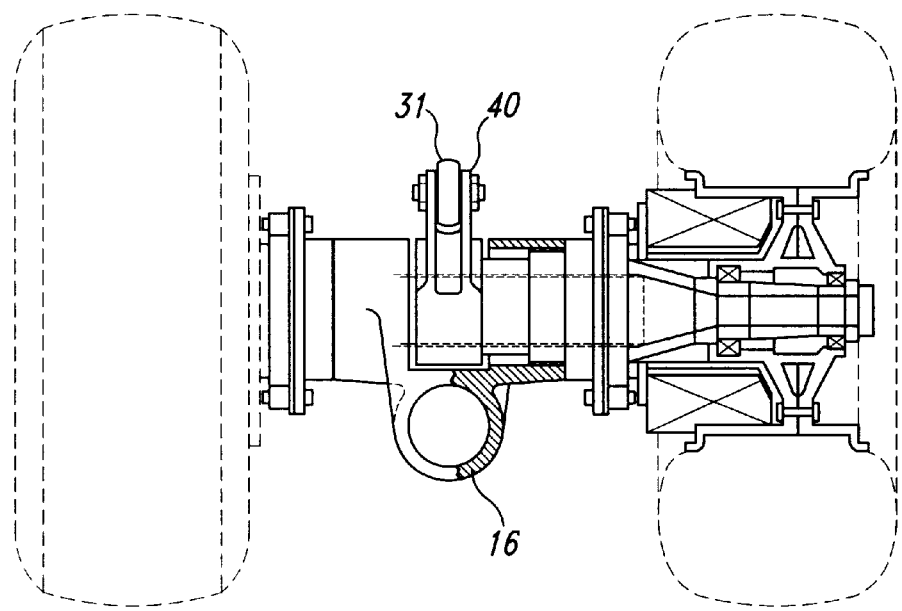

FIG. 22 is an enlarged section through a kingpin 32 and 33 steered main landing gear (see FIG. 21). Also illustrating how a single compensating link 31 in accordance with the present invention can be utilized to the advantage of the overall gear design (larger steering angles);

FIG. 23 shows a typical location of a kingpin relative to a group of brake hydraulic actuators 11;

FIG. 24 is a section where through the same plane as in FIG. 22 but through the center axle 24; and FIG. 25 is a section where through the same plane and location as FIG. 9B, but illustrating the integration of brake pressure plates 28, and kingpin support fittings 41 into a common fitting.

DETAILED DESCRIPTION

Current landing gears do not provide independent steering of each axle on multiple axle trucks. This limits the minimum turning radius of the aircraft and induces large loads on the truck structure, thus requiring correspondingly heavy construction. This invention as exemplified in the embodiments hereinafter described is directed to a main landing gear steering concept which employs Ackermann type steering which employs kingpins and tierods wherein a plurality of paired wheels are employed and wherein each truck axle is adapted for independent steering.

The term "single wheel steering" where utilized in the following description relates to main gears having a minimum of two wheels (twin) as shown, for example, in the embodiment of FIGS. 1 and 2.

The present main landing gear single wheel steering system reacts all movements due to brake drag and side loads provided these loads are equally distributed between the two wheels.

Small unequal movements due to unequal tire pressures or other incidental rolling friction variations can be accommodated by the steering actuator.

Larger unequal movements due to "one burst tire case (see FIG. 2)" and small deviations in frictional coefficients can be minimized by the use of the load equalization system solutions of FIGS. 3D, 3E, 3F and 3G. Such usage of load equalization in the present main landing gear single wheel steering systems is an option which could reduce reaction on the steering actuator by, e.g., 80 percent.

Turning now to FIG. 1, a plan view of a first embodiment of the present invention can be seen in which a main gear truck 20 having two wheels 24 comprises further a bell crank 26 with vertical pin 28 per wheel, each bell crank 26 being connected symmetrically with a tierod 30. Steering actuator 32 is coupled between bell crank 26 and main gear truck 20 by means of vertical pin 28. The forward direction is represented by arrow 40 and drag forces by arrows 42. This main landing gear single wheel steering system reacts all movements due to brake drag and side loads provided these loads are equally distributed between two wheels 22 and 24. Small unequal movements due to unequal tire pressures or other incidental rolling friction variations can be accommodated by steering actuator 32.

Figure 2:
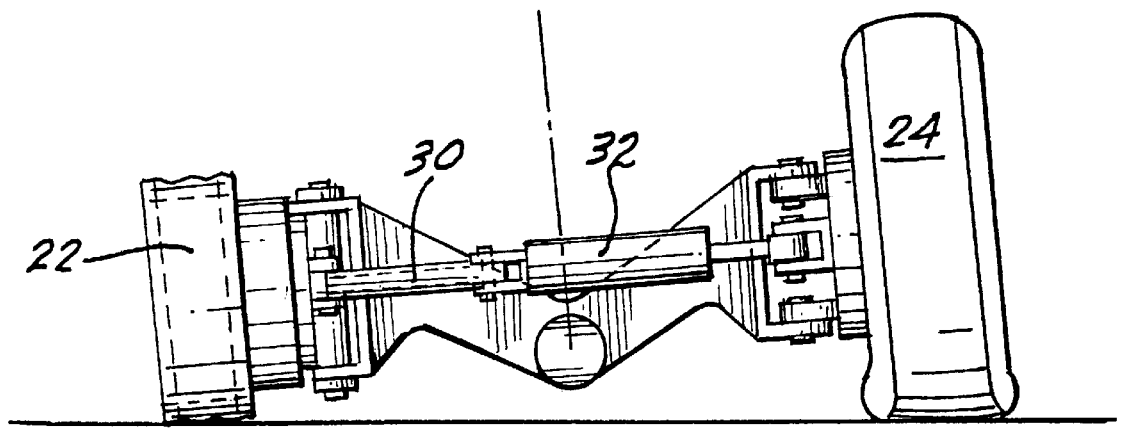
FIG. 2 is a view as FIG. 1 however looking forward and showing a flat tire.

Apart from the "one burst tire" case shown in FIG. 2 and small deviations in frictional coefficients, the movements about vertical pins 28 are equal and opposite. Each pin 28 is located in a bell crank 26 which are then connected symmetrically with a tierod 30 by means of a tensile load, a steering system used and known in the automobile industry as the "Ackermann" steering system. With the aforementioned conditions of small deviations in frictional coefficients, the load in actuator 32 would only be that required to move wheels 22 and 24 to the required steered position.

However, in the case of a flat tire (FIG. 2) wheel load equalization such as shown in FIGS. 3D, 3E, 3F and 3G must be used to enable the wheel rim (in the absence of the blown tire) to contact the ground. This maintains as much as possible the movement created by the rolling resistance of the tire prior to blowing. Any difference in rolling resistance of an unblown tire (24 in FIG. 2) and a wheel rim (tire 22 side in FIG. 2) will increase the steering actuator accordingly, "roll on rim" requirements however tend to keep this increase to a minimum.

Figure 3A:
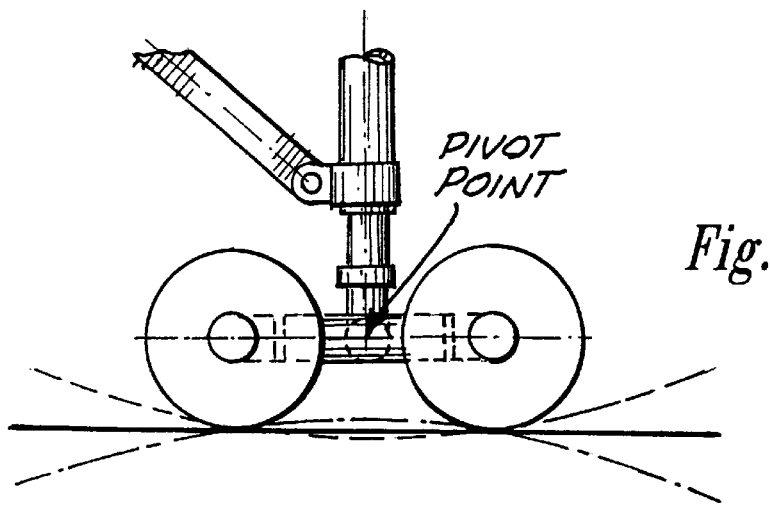
FIGS. 3A, 3B and 3C are descriptive and illustrative of the problem of wheel load equalization in multi-axled landing gear.

Turning now to the wheel load equalization problem, it can be appreciated that due to depressions and humps in the surface of runways it is difficult to achieve equal loading of wheels associated with multi-axed landing gears. Equal loading in a fore and aft direction for 3 or 4 wheeled trucks is achieved as shown in FIG. 3A.

Figure 3B:
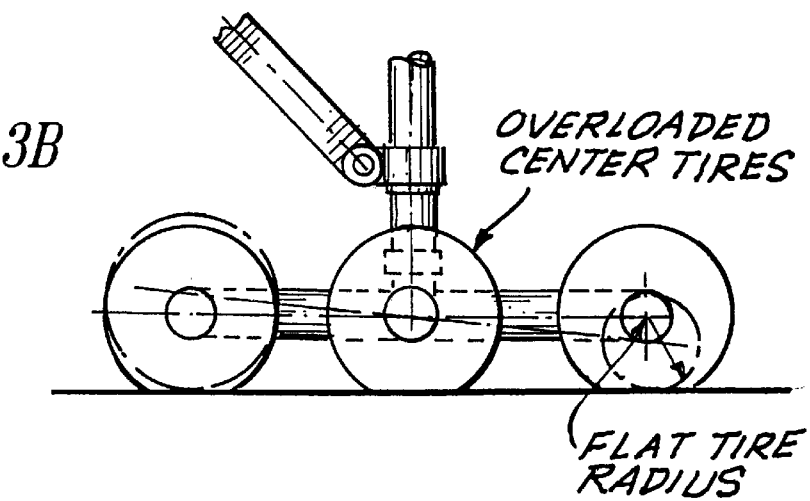

For trucks consisting of 5 (or more) wheels, load equalization cannot be achieved completely by the single continuous truck beam as shown in FIG. 3B.

Figure 3C:
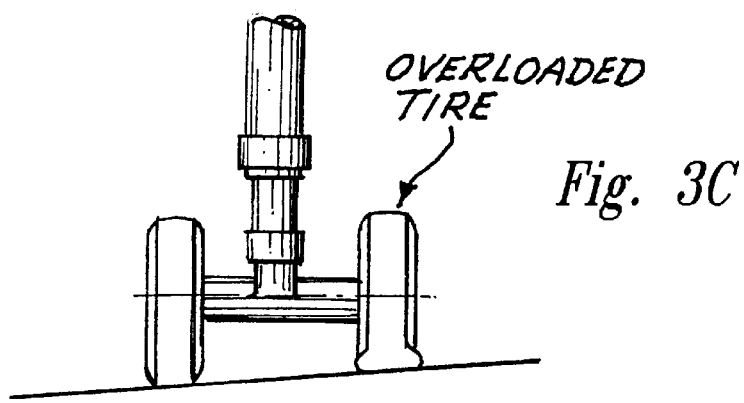

Equal loading in the transverse direction is not achievable on conventional wheel axles as shown in FIG. 3C. This statement applies to all landing gears having twin type multi-axles. Note:

The problem of unequal loading is less with landing gears having 4 (or less) wheels.

The deflection has a beneficial effect.

The problem becomes an issue with landing gears having 5 (or more) wheels.

Unequal tire loading would adversely affect brake performance, tire wear, and fatigue life of related component parts.

FIGS. 3D, 3E, 3F and 3G show proposed solutions to the problem of load equalization.

(a) Load Equalization—Fore and Aft Direction

FIGS. 3E and 3F illustrate the arrangement of multiple truck beams in order to achieve load equalization. This system could be expanded to utilize a 3rd order truck but is considered too complex and unnecessary for a landing gear application.

(b) Load Equalization—Transverse Direction

Note the horizontal pivot in FIG. 3G.

Wheel load equalization (fore and aft) is achieved by the use of primary and secondary truck beams as shown, e.g., in combinations of wheels above 5 (see FIGS. 3E and 3F).

Wheel load equalization (transverse) is achieved by introducing a horizontal pivot to each axle (see FIG. 3G).

In wheel load equalization a wheel truck for an aircraft landing gear carries a plurality of wheel sets, each set having a left hand wheel and a right hand wheel. The wheels of any given set are free to rotate about a longitudinal axis so that they will follow transverse ground contours as the aircraft taxis. Each wheel set, as a whole, can also pivot about a transverse axis, in order to adaptively follow longitudinal ground contours. The pivotable mounting arrangement of the wheels to the truck enables all wheels to maintain an equal force contact with the ground, so that one wheel will not be overloaded relative to another.

Advantages of Main Landing Gear Single Wheel Steering

1. Multiple Steering Modes

The arrangement herein before discussed of FIG. 1 can be incorporated for use in multiple wheeled gears as shown in FIGS. 4, 5, 6, 9 and 10. The directional control of each wheel is achieved by electronic control of the hydraulic directional valves of the wheels.

Steering arrangements for steering a 4-wheeled truck are shown in FIGS. 4A, 4B and 4C while steering a 6-wheeled truck is shown (moving to the right) in sequenced steps of FIGS. 5A, 5B and 5C.

Steering arrangements for an 8-wheeled truck are shown in FIGS. 8A, 8B, 8C and 8D.

FIG. 9A, Band C shows how the present single wheeled system can be utilized to offset the effect of a side drift landing. The angle of yaw is measured by any means (e.g., radar, lazer inertial control) and fed as an electrical signal to hydraulic directional control valves to obtain the required position of all wheels.

FIG. 10 is included merely for purposes of further understanding and shows an improbable situation but one which if it was at all practical could save landing gear weight by the near elimination of pivoting loads.

2. Reduced Movement Arm

The reduced movement arm is a result of the reduced distance from the kingpin centerline and tire centerline as compared to distances currently utilized in e.g., a Boeing type 747 body gear (of FIG. 6) where:

Steering Torque=FL/2 in lbs

The example for main gear single wheel steering is then as shown in FIG. 7 where:

Steering Torque=FL/5 in lbs (approximately)

Advantages of the Present Main Landing Gear Single Wheel Steering Embodiments Include 1. The use of the "Ackermann Steering System" on aircraft landing gear, i.e., the method of minimizing the loads normally transferred to the steering actuators.

2. The use of a steering system which permits individual wheel movement in different directions as required.

3. The feature of the steering angle being twice that of the single wheel angular movement. This is achieved by steering leading and trailing twin axles in opposite directions. (See FIGS. 4C, 5C and 8A, 8B and 8C.)

4. The ability of all wheels on all gears to be directionally controlled for all side drive landing using the main gear steering system. (See FIGS. 9A, and 9D.)

5. Possible positioning of wheels for relieving pivoting loads.

Achieving Brake Compensation Through Axle to Brake Plate Intergration

Background of Axle to Brake Plate Intergration

Description of the Prior Art Systems

In order to more fully understand the invention hereinafter described it is necessary to understand the present methods of transferring brake torque (from brake to stationary structure) for different types of landing gear, e.g., such as in single and twin axle gears for purposes of illustration.

Single and Twin Axle Gears

The simplest method of transferring brake torque from the brake to a stationary part of the gear, is by means of shear bolts in a flanged mounted construction. Typical configurations are shown in FIGS. 11 and 12 for single and twin axles respectively. FIG. 13 shows a typical arrangement of these shear bolts 10 relative to the brake hydraulic actuators, 11 and is common to both FIGS. 11 and 12. A hollow axle 12 is used for both types of gears, and is prevented from rotating relative to the gear inner cylinder 15 by a lock pin 13.

Application of the present invention for these types of gears is impractical as there is no relative rotation between the pressure plate assemblies 28 and the gear inner cylinder 15, during gear retraction, and consequently brake compensating links are not used. In addition, there is probably no requirement for main gear steering for these types of gears.

Gears With Two (or more) Axles

The most common of these gears is the 4-wheeled truck type, but the more recent 6-wheeled truck arrangements (shown in FIGS. 14 and 15) are types of gears more likely to be utilized as aircraft get larger and heavier.

Landing gears with 4-wheel trucks cannot have rigid flange mounted brake connections, due to the rotation of the truck assembly 16 relative to the inner cylinder 15 during landing, taxiing, and during retraction. (Differences between FIGS. 14 and 16 illustrate this rotation.) This also applies to the fore and aft axles of 6-wheeled trucks. In these cases, the brake torque for each individual brake, is transmitted to the non rotating inner cylinder 15 by means of a pin jointed link, generally known as a brake compensating link 17 Fore and 17 Aft.

The brake compensating link pin joints are shown as 20, 21, and 22 in FIGS. 14 and 15, and are of course, left and right handed. In most brake designs the brake "Stator" assemblies 27 and 29 includes the brake pressure plates 28 which contains the brake hydraulic actuators, 11 and is held stationary against rotation (around the axle) by the Compensating Links 17 fore and 17 aft, during the braking operations. The pressure plate assembly, although located on the axle, is allowed to revolve on that axle as the angle "θ" varies during the gear retraction (see FIG. 16).

Problems With Prior Art Systems When Main Gear Steering is a Requirement

In order to meet the main gear steering requirements, brake compensating links 17 fore and aft, have to align with the steered wheels (see FIG. 20). Such a steering angle (20° minimum) would be in excess of the angular movement of ball joints are used in brake compensating links, and which usually have operating limits of ±15° Max.

The presence of a conventionally installed brake compensating link 17 restricts the inboard excursion of the tire during main gear steering (see FIG. 8).

Full efficiency of brake compensation is not maintained when braking and steering occur simultaneously. Brake compensating links axle geometry deviates from a true parallelogram as the steering angle increases.

Prior Art Patents

U.S. Pat. No. 3,403,875 (Hartman) discloses a landing gear in which the brake is mounted on the end of a non-rotating axle stub where the wheel assembly slips over the brake and axle stub, engaging the rotating brake disks by splines on the inside of the hollow axle. The wheel bearing is mounted around the axle stub and the wheel bolts to the outer race of the bearing.

U.S. Pat. No. 4,659,040 (Sinclair) discloses a landing gear truck in which the two rear wheels can swing relative to the front wheels to allow steering at relatively small radii without excessive tire scuff. In this braking system one wheel is fixed to a rotatable common axle while the other wheel is free to rotate about the axle. The braking system is all concentrated in the vicinity of the free wheel where the free wheel is braked and the axle is braked thus braking the other wheel.

Summary of Brake Compensation Through Axle to Brake Plate Integration

It is an object to provide a structure between adjacent wheel brakes which rigidly joins the right-hand brake stator 27 to the left-hand brake stator 29 (see FIG. 22). This structure is then capable (when assembled to the gear truck beam 16) of rotating in the plane of axle rotation during retraction, and transferring the brake torque by means of a single compensating link 31, per pair of wheels. A single compensating link 31 permits larger steering angles compared to a conventional double link arrangement, due to the flexibility of its installation position, and its independence of the steerable components. If for installational reasons, a double link is necessary, the present invention would still favor larger steering angles.

In contrast to prior systems having a maximum steering angle of ±8°, the present axle/brake plate integration removes at least this constraint. The present system's ability to move links toward the center of the truck, results in increased clearance between the tire and the compensating rod consequently allowing more steering capacity, about an additional 7°.

More importantly, the single compensating links' geometry, being independent of the wheel steering angle, maintains the characteristics of a parallelogram with the wheel axles, even during steering. Present systems cannot achieve this completely as the conventional compensating link tries to lengthen or shorten depending upon which direction the wheel is being steered, due to one end of each link being fixed (See FIGS. 20 and 21 particularly with regard to components 22/22A, and 20/20A).

Although the effect is undoubtedly small, the inability of the conventional geometry to maintain a parallelogram with the axles, induces out of balance forces and moments to the truck beam and links during steering. The present invention eliminates this possibility.

The word "parallelogram" is partially defined in FIGS. 14 and 16. The parallelogram is described in those two figures by the points 20, 23 and 21, 24, and 22, 25. The lengths between brake rod points (20 and 21), and (21 and 22), are identical to lengths between axle points (23 and 24) and (24 and 25) respectively, and the distances between (23 and 20) and (24 and 21) and (25 and 22) are all identical also, and is therefore a parallelogram.

This configuration remains a parallelogram no matter what attitude the main cylinder (15 and 30) relative to the centerline connecting the axles (25, 24 and 23) happen to be.

It is desirable that point 24 (the point of rotation between the main cylinder (15 and 30) be on the same waterline as that of the axles 25, 24 and 23. If, for other reasons of design, point 24 is not on the desired waterline, then an out-of-balance turning moment occurs in the truck when the brakes are applied, and the result is such that there is an ever increasing tendency particularly in the taxiing mode, for the front axle to become overloaded, and the rear axle to lift off the ground. This situation can be overcome by positioning the brake rods such that the instantaneous centers of both the rods and axles intersect each other at the static ground line.

Unfortunately, this process allows a truck to be fully balanced only when the gear system is in the static position which is the most important case. However, for all other gear attitudes (usually during gear retraction or extension), dampers can be used to reduce or eliminate any unbalanced moments on the truck when the brakes are applied. Such dampers are used extensively, but usually for truck positioning purposes only. Their function as a means of reducing, or eliminating this unbalance moment is probably not taken into account.

The reason that the single brake rod would be preferred is that its positioning (nearer to the C/L of the truck) allows the wheel and tire assembly more angular movement, (i.e., ±15 degrees approx. max.) This angle is sometimes less, depending upon the wheel well door opening size or the strength of character of the gear designer.

It must be understood that tire, wheel and brake rotors rotate from the start of an aircraft's takeoff roll, to the time when either internal friction overcomes the momentum of the mass of that assembly when airborne, or the pilot applies the brakes prior to the gear entering the wheel well. This means that for the latter, (and for all instances of brake application) the torque that develops at each brake must be reacted by two equal but opposing forces, acting parallel to each other. Both of these forces leave or enter the first available stationary structure (main inner and outer cylinders), one via the compensating link (single or double), and the other via the truck itself (see FIG. 18).

Detailed Description of Axle to Brake Plate Integration

Certain distinctive problems arise as aircraft designs proceed into the weight range of 900,000 to 1,500,000 pounds relating to "flotation", a term given to the aircraft/runway relationship, and "maneuverability", a term given to the ability to turn an aircraft on the ground. Flotation and maneuverability have adverse effects on one another.

The aircraft/runway relationship is a method by which the strength of a runway is compared with the weight distribution of an aircraft when on the ground. Even with runway improvement (strengthening), it is to be expected that the number of wheels will increase as the aircraft weight increases. This keeps tire sizes to within a practical maximum. Those wheels will be also spread apart as much as possible in order to minimize runway load concentration.

As a result of this, the landing gear designer is called upon to provide the most efficient main gear steering possible. The wheel position, size, and quantity, being predetermined by the aircraft design and runway strength requirements.

It should be appreciated therefore that axle to brake plate integration is more applicable to 4-wheel, and/or 6-wheel trucks, as compared to single or twin wheel configurations. In a very large aircraft, a 6-wheel truck is used for exemplary purposes in the detailed description given hereinafter.

It has also a criteria that in order for large aircraft to maneuver successfully on even modern airports, and to keep tire scrub (or wear) to an acceptable minimum, wheel steer angles of over 20° are anticipated.

The hereinafter described feature enables these large angles to be achieved by a particular system configuration for preventing interferences with either the tire or wheel during the steering operation.

As hereinafter described, the present axle to brake plate integration may be utilized in an individual (kingpin) wheel steering system for aircraft landing gear system as hereinbefore described in contrast to the use thereof in coupled wheel steering systems (aft axle) of the prior art.

The fundamental geometrical differences between these two systems can be demonstrated by comparing FIGS. 20 and 21.

In order to effectively join the left and right hand brake pressure plates (or brake stators), substantial thought has to be given to the reliability and maintainability of component details. The design shown in FIG. 22 illustrates a typical method of indexing and locking a critical load carrying assembly which concept could be subject to a numerous detail variations.

The two kingpin support fittings 41 are assembled end to end (see FIG. 22) and located in cross bearing 38 as part of truck beam assembly 16. These fittings are positioned radially be means of key ways, dogs, pawls, or any other locating device that would accurately position kingpin assemblies 32 and 33 parallel to each other.

In addition, the assembled kingpin support fittings 41 radically locate the brake compensating link arm 40 in such a way that on final assembly into truck beam assembly 16 and horizontal and both the center lines of the kingpin assemblies 32 and 33 and the inner cylinder 15 vertical, the single compensating link can be assembled.

When this stage of assembly is accomplished, kingpin support fitting 41 is secured by inserting cross pin 35 which is then, in turn, torqued and locked by locknut and split cotter pin 36 and 37 respectively.

Brake pressure plates 28 are now assembled (secured by kingpin assemblies 32 and 33) and hydraulic power connected. It is intended that the wheel, tire, and brake assemblies be assembled either as a unit or in parts (as indicated in FIG. 24).

Application of Axle to Brake Plate Integration When Main Gear Steering is not Required An aircraft with only two main gears, and having a requirement for a 6-wheel truck, usually does not require the center axle to steer.

Without the need for the kingpin in assemblies 32 and 33 some form of bolted construction between brake pressure plates 28 and kingpin support fittings 41 will reduce cost and weight (see FIG. 24).

A further reduction of manufacturing cost and component weight would be achieved aforementioned two components integrated into one unit (see FIG. 24).

In this configuration, thereby having a favorable effect upon brake performance and integrity.

Axle to brake plate integration as hereinbefore described facilitated the optimization of wheel steering angles for main landing gears having more than four wheels, and where there is a requirement for main landing gear steering. Also, the present axle to brake plate integration ensures the continued transfer of brake torque from the brake to the static portion of the landing gear structure for main landing gears having more than four wheels, and having a requirement for main landing gear steering.

Hardware nomenclature utilized in the present axle to brake plate integration for large aircraft landing gear:

10 Shear Bolts
11 Brake Hydraulic Actuators
12 Hollow Axle
13 Lock Pin
15 Inner Cylinder
16 Gear Truck Beam Assembly
17 Brake Compensating Link
18 Center Axle
19 Lower Pivot
20 Brake Compensating Link Pins (Forward)
21 Brake Compensating Link Pins (Center)
22 Brake Compensating Link Pins (Aft)
23 Axle Centers (Forward)
24 Axle Centers (Center)
25 Axle Centers (Aft)
26 Truck Rotation Angle (0°)
27 Brake "Stator" Assembly R.H.
28 Brake Pressure Plate
29 Brake "Stator" Assembly L.H.
30 Landing Gear Post
31 Single Compensating Link
32 Kingpin Assembly R.H.
33 Kingpin Assembly L.H.
34 Wheel Housing
35 Cross Pin
36 Lock Nut
37 Split Cotter Pin
38 Cross Bearings
39 Indexing Keys
40 Brake Compensating Link Arm
41 Kingpin Support Fitting The herein before described axle to brake plate integration provides features and advantages which include the following:

The ability to use a single brake compensating link 31 in order to transfer the torque of two brakes to stable structure.

The obtaining of optimized main gear steering angle, by the ability to position a single brake compensating link 31 further inboard in the truck beam assembly 16.

Enables the wheel steering angle to exceed that of the brake compensating link ball joint capability.

Achieve the joining of the two opposite brake pressure plate assemblies 28 and to provide rotation of these assemblies in the same plane as the axle rotation, together with the indexing these assemblies.

Achieves 100% brake torque compensation for all angles of wheel steering (in conjunction with kingpin or single wheel steering).

The independence of the brake compensating link with respect to the brake pressure plate enables the distance between tires to be increased (as required to meet aircraft flotation needs) without giving the brake compensating link a three dimensional geometry. This feature is advantageous in terms of space packaging, weight, and possible limitations of angular movement of ball joints. A two dimensional geometry is achieved by lengthening the pivoting intermediate support fitting.

The use of short stub axles in high temperature environments for multi-wheeled, truck type gears results in increasing rapidly with the bending moment. This provides for a much higher stiffness in brake installation and possible weight reduction.

The pivoting intermediate support fittings on the left side of the truck, can be connected to the pivoting intermediate support fittings on the right side of the truck. This enables one set of compensating links per truck assembly to be in lieu of two, and while not so much a weight saving device, is a space consideration.

What is claimed is:

1. A steerable main landing gear for a large aircraft, comprising in combination:

a main gear having a truck assembly with a minimum of four wheels and including a bell crank, with a vertical pin for each said wheel that is required to be steered;

a tierod;

each bell crank connected symmetrically with said tierod, simultaneously connecting said steered wheel with its adjacent wheel;

a steering actuator;

said actuator powered by either hydraulics, pneumatics, electric, or mechanical means, coupled between each said bell crank and main gear truck by said vertical pin;

a connecting shaft;

said connecting shaft ensuring co-rotation of brake assemblies, including said adjacent bell cranks and tierod;

said connecting shaft connecting adjacent wheel assemblies to enable relative radial motion between said assemblies and truck.

2. In combination in a large aircraft steerable main landing gear according to claim 1, and including:

a multiple axis truck having independently steered axles, and a rotation capability relative to the lower sliding member of the gear by means of a horizontal pin (ground load equalization), a multiple axis truck having independently steered axles, and a horizontal pivot in each axle for providing ground load equalization.

3. In combination in a large aircraft steerable main landing gear according to claim 1, and including:

primary and secondary truck beams for providing ground load equalization.

4. In combination in a large aircraft steerable main landing gear according to claim 1 and including:

a landing gear system for offsetting the effect of a side drift landing;

a plurality of multi-wheeled gears; and a corresponding plurality of hydraulic-pneumatic directional control valves for positioning each of the wheels of said multiple wheeled gears.

5. In combination in a large aircraft according to claim 1, said truck assembly further including pivotal mounting arrangements for each of said wheels to enable said wheels to turn at predetermined angles to minimize tire wear.

6. The main landing gear of claim 4 further includes pivotal mounting arrangements for each of said wheels to enable each wheel to maintain a substantially equal force contact with the ground.

* * * * *